US008270721B2

(12) United States Patent
Schiehlen

(10) Patent No.: US 8,270,721 B2
(45) Date of Patent: Sep. 18, 2012

(54) METHOD AND SYSTEM FOR ACQUIRING DATA FROM MACHINE-READABLE DOCUMENTS

(75) Inventor: Matthias Schiehlen, Constance (DE)

(73) Assignee: Open Text S.A., Luxembourg (LU)

( * ) Notice: Subject to any disclaimer, the term of this patent is extended or adjusted under 35 U.S.C. 154(b) by 107 days.

(21) Appl. No.: 12/495,755

(22) Filed: Jun. 30, 2009

(65) Prior Publication Data

US 2010/0094888 A1   Apr. 15, 2010

Related U.S. Application Data

(63) Continuation of application No. 10/573,429, filed as application No. PCT/EP2004/009539 on Aug. 26, 2004, now abandoned.

(30) Foreign Application Priority Data

Sep. 30, 2003   (DE) .................................. 103 45 526

(51) Int. Cl.
   *G06K 9/46*   (2006.01)
(52) U.S. Cl. ......... 382/190; 382/161; 382/284; 382/309
(58) Field of Classification Search .................. 382/190, 382/181, 175, 173, 161, 284, 292, 309
   See application file for complete search history.

(56) References Cited

U.S. PATENT DOCUMENTS

| 3,611,291 | A | * | 10/1971 | Frank ............................. 382/182 |
| 3,925,760 | A | * | 12/1975 | Mason et al. ................. 382/310 |
| 4,272,756 | A | * | 6/1981 | Kakumoto et al. ........... 382/284 |
| 4,933,979 | A | * | 6/1990 | Suzuki et al. .................. 382/173 |
| 5,317,646 | A | * | 5/1994 | Sang et al. ..................... 382/175 |
| 5,339,421 | A | * | 8/1994 | Housel, III ..................... 719/328 |
| 5,448,375 | A |   | 9/1995 | Cooper et al. |
| 5,594,809 | A |   | 1/1997 | Kopec et al. |
| 5,659,791 | A | * | 8/1997 | Nakajima et al. ............. 715/202 |
| 5,666,549 | A |   | 9/1997 | Tsuchiya et al. |

(Continued)

FOREIGN PATENT DOCUMENTS

DE   10342594   4/2005

(Continued)

OTHER PUBLICATIONS

Casey R.G. et al., Intelligent Forms Processing, IBM Systems Journal, IBM Corp., Armonk, NY, US, vol. 29, No. 3, Jan. 1990, pp. 435-450, ISSN 0018-8670.

(Continued)

*Primary Examiner* — Wesley Tucker
*Assistant Examiner* — Aklilu Woldemariam
(74) *Attorney, Agent, or Firm* — Sprinkle IP Law Group

(57) ABSTRACT

In a method for acquiring data from a machine-readable document for assignment to fields of a database, individual data are extracted substantially automatically from the document and entered into the corresponding database fields. If data cannot be extracted from the document with a desired degree of reliability for one or more particular database fields, then the steps are executed of displaying the document onto the display screen, displaying on the display screen the at least one or more database fields for which the data cannot be extracted with the desired degree of reliability, and executing a proposal routine with which string sections in the vicinity of a pointer movable by a user on the display screen are selected, marked, and proposed for extraction.

13 Claims, 10 Drawing Sheets

U.S. PATENT DOCUMENTS

| | | | |
|---|---|---|---|
| 5,680,223 A | 10/1997 | Cooper et al. | |
| 5,689,620 A | 11/1997 | Kopec et al. | |
| 5,717,794 A * | 2/1998 | Koga et al. | 382/309 |
| 5,732,260 A * | 3/1998 | Nomiyama | 1/1 |
| 5,835,712 A | 11/1998 | DuFresne | |
| 5,923,792 A | 7/1999 | Shyu et al. | |
| 5,963,966 A | 10/1999 | Mitchell et al. | |
| 5,966,473 A | 10/1999 | Arima et al. | |
| 6,028,970 A * | 2/2000 | DiPiazza et al. | 382/309 |
| 6,035,282 A * | 3/2000 | Tamai et al. | 705/23 |
| 6,108,674 A * | 8/2000 | Murakami et al. | 715/223 |
| 6,131,102 A | 10/2000 | Potter | |
| 6,353,840 B2 * | 3/2002 | Saito et al. | 715/202 |
| 6,457,004 B1 * | 9/2002 | Nishioka et al. | 1/1 |
| 6,928,449 B2 * | 8/2005 | Ten-Hove et al. | 1/1 |
| 6,941,521 B2 * | 9/2005 | Lin et al. | 715/762 |
| 7,085,437 B2 * | 8/2006 | Nakajima et al. | 382/311 |
| 7,221,796 B2 * | 5/2007 | Nishiyama et al. | 382/182 |
| 7,706,611 B2 * | 4/2010 | King et al. | 382/181 |
| 2002/0141660 A1 * | 10/2002 | Bellavita et al. | 382/309 |
| 2003/0115189 A1 * | 6/2003 | Srinivasa et al. | 707/3 |
| 2004/0243552 A1 * | 12/2004 | Titemore et al. | 707/3 |
| 2007/0065011 A1 | 3/2007 | Schiehlen | |

FOREIGN PATENT DOCUMENTS

WO      WO 98/47098 A      10/1998

OTHER PUBLICATIONS

Baeza-Yates and Ribeiro-Neto, Modern Information Retrieval, pp. 192-199 and 216-219, Addison-Wesley Press, Reading, MA, ISBN 0-201-39829-X, 1999.

International Search Report for International Application No. PCT/EP2004/009539, completed Feb. 16, 2005, mailed Mar. 31, 2005 (with English translation), 6 pgs. Patent Cooperation Treaty.

Written Opinion for International Application No. PCT/EP2004/009539, completed Feb. 16, 2005, mailed Mar. 31, 2005, 8 pgs. Patent Cooperation Treaty.

International Preliminary Report on Patentability (Chapter II) for International Application No. PCT/EP2004/009539, completed Oct. 2, 2006 (with English translation), 32 pgs. Patent Cooperation Treaty.

Office Action for U.S. Appl. No. 10/573,429, mailed Dec. 31, 2008, 17 pgs.

* cited by examiner

FIG. 2 hpostest – DOKuStar Validation
File Edit View Navigate Image Tools Help

Invoice

Invoice
Invoice

Documents ► Schema 1

4/1

A. Müller, Werkzeugbauer GmbH, Musterstraße 25, 78467 Musterstadt

ABC Travelling AG
Wareneingang
Bodenseestraße 1

12345 Konstanz

Hammer, Meisel, Zanga
Schraubenziahar
Werkzeugbau
Mechanische Boarbeilung

1

RECHNUNG
Nummer         4361        5
Datum          02.08.2002          Seite 1
Kunden-Nr.     01407

Versand per Speditio
und per Post

| Pos | Artikel | Menge/Einheit | Preis |
|---|---|---|---|
| | Lieferschein Nr.3333 v,31.07.02 und Nr.3334 v, 01.08.02 Ihre Bestellung :1234456789 v. 13.06.02 | | |
| 1 | Gewicht A96321-M350-B123 Stückgewicht 0,012 kg | 229 Stück | 2,92 |
| 2 | Gewicht A96321-M350-B123 Stückgewicht 0,012 kg | 233 Stück | 2,92 |
| 3 | FTG | 4,62 kg | 1,38 |
| 4 | ETG | 4,62 kg | 0,41 |
| 5 | Verpackung | | 7,67 |
| | | Zwischensumme | |
| | Mehrwersteuer 16% auf EUR 1364,98 | ENDBETRAG | |

B

4/2

4/3

3  [empty]
3  [empty]
3  [empty]
   [empty]
   [empty]
   [empty]
   [empty]

S0173 Hannover

18 Januar 2003　　Seite 1
Kundennr.
Geshbetein
Dunchmt
Disgfan
Excreb

Bestellung (geandert)
Bestell Nr. 31335-200209

| Nengr | Berveiburg der Lshng | Lieftemin | Liefesm | Liefesm |
|---|---|---|---|---|
|  | Wir beteller zu den Badingen de HGB/BGB |  |  |  |
| 2000 kg | Unsere Artikel Nt. 1011<br>Ultranid A3-WG 7, natur | 20.01.03 |  |  |
| 3000 kg | Unsere Artikel Nt. 1197<br>Ultranid A.S.K., natur | 14.01.03 | 2,40 EUR | 7,200,00 |
| 1000 kg | Unsere Artikel Nt. 1770<br>Ultranid AIH | 20.01.03 |  |  |
| 5000 kg | Unsere Artikel Nt. 1015<br>Ultranid B3-WG 7, natur | 20.01.03 |  |  |
| 8000 kg | Unsere Artikel Nt. 1014<br>Ultranid B3-WG 6, natur | 20.01.03 |  |  |
| 5000 kg | Unsere Artikel Nt. 1505<br>Ultranid S3-ZG 6, natur | 20.01.03 |  |  |
| 6 Stick | Unsere Artikel Nt. 20019<br>Weskizaugnia<br>nach DW 500.927 | 20.01.03 |  |  |
| 1000 kg | Unsere Artikel Nt. 1032/2074781<br>Ultranid B3-M6, schwarz | 20.01.03 |  |  |
| 1 Stick | Unsere Artikel Nt. 20019<br>Weskizaugnia<br>nach DW500.922 | 20.01.03 |  |  |
|  |  |  | Euros | 7,200,00 |

Zahbar znerko.14 Tagemir 3 Skonto, 30 Toge neuo
Lieferung srfelgtal Haus, Ninastosblich Verpankung.

*FIG. 8*

S0173 Hannover

18 Januar 2003  Seite 1
Kundennr. ■
Geshbetein ■
Dunchmt
Disgfan ■
Excreb

Bestellung (geandert)
Bestell Nr. 31335-200209

| Nengr | Berveiburg der Lshng | Lieftemin | Liefesm | Liefesm |
|---|---|---|---|---|
| | Wir beteller zu den Badingen de HGB/BGB | | | |
| 2000 kg | Unsere Artikel Nt. 1011<br>Ultranid A3-WG 7, natur | 20.01.03 | | |
| 3000 kg | Unsere Artikel Nt. 1197<br>Ultranid A.S.K., natur | 14.01.03 | 2,40 EUR | 7,200,00 |
| 1000 kg | Unsere Artikel Nt. 1770<br>Ultranid AIH | 20.01.03 | | |
| 5000 kg | Unsere Artikel Nt. 1015<br>Ultranid B3-WG 7, natur | 20.01.03 | | |
| 8000 kg | Unsere Artikel Nt. 1014<br>Ultranid B3-WG 6, natur | 20.01.03 | | |
| 5000 kg | Unsere Artikel Nt. 1505<br>Ultranid S3-ZG 6, natur | 20.01.03 | | |
| 6 Stck | Unsere Artikel Nt. 20019<br>Weskizaugnia<br>nach DW 500.927 | 20.01.03 | | |
| 1000 kg | Unsere Artikel Nt. 1032/2074781<br>Ultranid B3-M6, schwarz | 20.01.03 | | |
| 1 Stck | Unsere Artikel Nt. 20019<br>Weskizaugnia<br>nach DW500.922 | 20.01.03 | | |

| Euros | 7,200,00 |
|---|---|

Zahbar znerko.14 Tagemir 3 Skonto, 30 Toge neuo
Lieferung srfelgtal Haus, Ninastosblich Verpankung.

*FIG. 9*

METHOD AND SYSTEM FOR ACQUIRING DATA FROM MACHINE-READABLE DOCUMENTS

CROSS-REFERENCE TO RELATED APPLICATIONS

This application is a continuation of U.S. patent application Ser. No. 10/573,429, filed on Dec. 11, 2006 now abandoned and entitled METHOD AND SYSTEM FOR ACQUIRING DATA FROM MACHINE-READABLE DOCUMENTS, which is a U.S. National Stage Application of International Application No. PCT/EP2004/009539 filed Aug. 26, 2004 and entitled METHOD AND SYSTEM FOR ACQUIRING DATA FROM MACHINE-READABLE DOCUMENTS, which claims priority to DE 103 45 526.4 filed Sep. 30, 2003.

BACKGROUND

The preferred embodiment invention relates to a method and a system for acquiring data from machine-readable documents, the data being assigned to a database, in which individual data are extracted from the document as automatically as possible and are entered into corresponding database fields, the method and system according to the present invention relating to the acquisition of data in the case in which data cannot be extracted with the necessary degree of reliability for one or more particular database fields of a document.

Methods and systems for acquiring data from machine-readable documents are known. In the standard situation, the systems have a scanner with which documents are optically scanned. The data files produced in this way are machine-readable documents, and as a rule contain text elements. The text elements are converted into coded text with the aid of an OCR device. As a rule, predetermined forms or templates are assigned to the data files, so that on the basis of the forms, data files containing particular items of information from the text can be determined in a targeted manner. These items of information are stored for example in a database.

Methods and systems of this sort are used for example in large firms in order to read invoices. The data extracted in this way can be communicated automatically to an accounting software program.

Such a system is described in U.S. Pat. No. 4,933,979. This system has a scanner for the optical scanning of forms. In this system, a large number of types of forms can be defined, each type of form or template being defined by a plurality of parameters, in particular geometrically defined areas in which texts or images are to be contained. The form types can also be defined by additional characteristics, such as for example the type of script contained in the texts (letters, numbers, symbols, katakana, kanji, handwriting). After a form has been scanned, a template is assigned to the scanned form using a form type distinguishing device. Correspondingly, the data contained in the text field are read and extracted using an OCR device. If no suitable template exists, it is necessary to create one.

From WO 98/47098, another system is known for the automatic acquisition of data from machine-readable documents. Here, a scanner is used to optically scan forms. Subsequently, a line map of the form is created automatically. Here, on the one hand all lines are acquired, and all graphic elements are converted into a line structure. Other elements, such as for example text sections, are filtered out. All vertical lines form the basis for creating a vertical key, and all horizontal lines form the basis for creating a horizontal key. Subsequently, it is determined whether a template already exists having a corresponding vertical and horizontal key. If this is the case, the data are read out using a corresponding template. If this is not the case, then on the basis of the scanned-in form a template is created and stored using a self-learning mode.

In the book Modern Information Retrieval by Baeza-Yates and Ribeiro-Neto, Addison-Wesley Press, ISBN 0-201-39829-X, the basic principles of databases and information stored for rapid finding in databases are explained. Thus, in Chapter 8.2, a method using inverted data files, also designated an inverted index, is described. In this method, from a text that is to be examined first a dictionary is created having all the words contained in the text. Each word in the dictionary is assigned one or more numbers that indicate the location at which the word occurs in the text. Such inverted data files enable a more rapid automatic analysis of a text that is to be searched. In Chapter 8.6.1, a string matching method is described in which two strings are compared and a cost measure is calculated that is indirectly proportional to the similarity of the strings. If the two strings are identical, the magnitude of the cost measure is zero. The more the strings differ, the greater is the magnitude of the cost measure. The cost measure is thus an expression of the similarity of the two strings. This and similar methods are also known under the names approximate string matching, Levenshtein method, elastic matching, and Viterbi algorithm. These methods are part of the field of dynamic programming.

In the not-yet-published patent application DE 103 42 594.2, a method and a system for acquiring data from a plurality of machine-readable documents are described in which, from a document that is to be processed—the read document—data are extracted by reading them out at positions in the read document that are determined by fields entered in a master document.

If an error occurs during the reading out of the read documents, the read document is displayed on a display screen and the data can be read out only by marking corresponding fields in the read document. Here, if it is required, additional master documents are automatically produced on the basis of the marked read documents, or existing master documents are correspondingly corrected. This system is easy enough to use that no special computer or software knowledge is necessary.

A method that supports an operator in the generation of electronic templates for a form recognition system arises from U.S. Pat. No. 5,317,646. For this, a form not provided with data (what is known as a master form) is shown on a screen, and the user can identify the data fields with a pointer device. The coordinates that bound the corresponding region are automatically detected after which a single point within this region has been selected by the operator. Templates for the automatic form recognition can be created simply and quickly with this method.

In Casey R. G. et al., "Intelligent Forms Processing", IBM Systems Journal volume. 29 (1990) Nr. 3, pages 435 through 450, a form recognition method is described in which a scanned-in form is analyzed by means of image processing techniques and is compared with other stored template forms. In the event that no correlation with a template form is found, a new template form must be generated via input on a computer. In the generation of a template, the scanned form is shown on the screen and the boundary lines of the input fields are marked with a pointer device.

A two-stage method in which form templates can be initially input and documents can be automatically read out using the input form templates arises from US 2002/141660 A1. Form templates to be input are scanned, and the operator indicates input fields with a cursor. The position and size of the input fields is stored. The operator can also determine the data type associated with each data field. Given automatic reading of forms, these are scanned in and automatically read out using the data fields contained in the stored form documents. In the event that an error occurs in the readout, the operator can correct the errors via the keyboard.

U.S. Pat. No. 6,028,970 concerns a method and a system for automatic text recognition (OCR). The system comprises an error correction module ("error correction logic module"). This error correction module is applied to clearly detectable data errors in order to correct these. These corrections are executed automatically. Not only errors of individual letters are hereby detected, but rather errors in context are analyzed and correspondingly corrected. An error that cannot be automatically corrected can be communicated to the operator by means of an error message. The operator can then assess and, if applicable, correct the text generated by means of the text recognition.

It is an object to create a method and a system for acquiring data from machine-readable documents in which the inputting of the data is significantly simplified in comparison with the known methods in cases in which data cannot be automatically extracted.

In a method for acquiring data from a machine-readable document for assignment to fields of a database, individual data are extracted substantially automatically from the document and entered into the corresponding database fields. If data cannot be extracted from the document with a desired degree of reliability for one or more particular database fields, then the steps are executed of displaying the document onto the display screen, displaying on the display screen the at least one or more database fields for which the data cannot be extracted with the desired degree of reliability, and executing a proposal routine with which string sections in the vicinity of a pointer movable by a user on the display screen are selected, marked, and proposed for extraction.

BRIEF DESCRIPTION OF THE DRAWINGS

FIGS. 2-6 each show copies of display screen representations corresponding to individual method steps of the method indicated in FIG. 1;

FIGS. 8, 9 each show a table with marked data; and

DESCRIPTION OF THE PREFERRED EMBODIMENT

Figure 1:
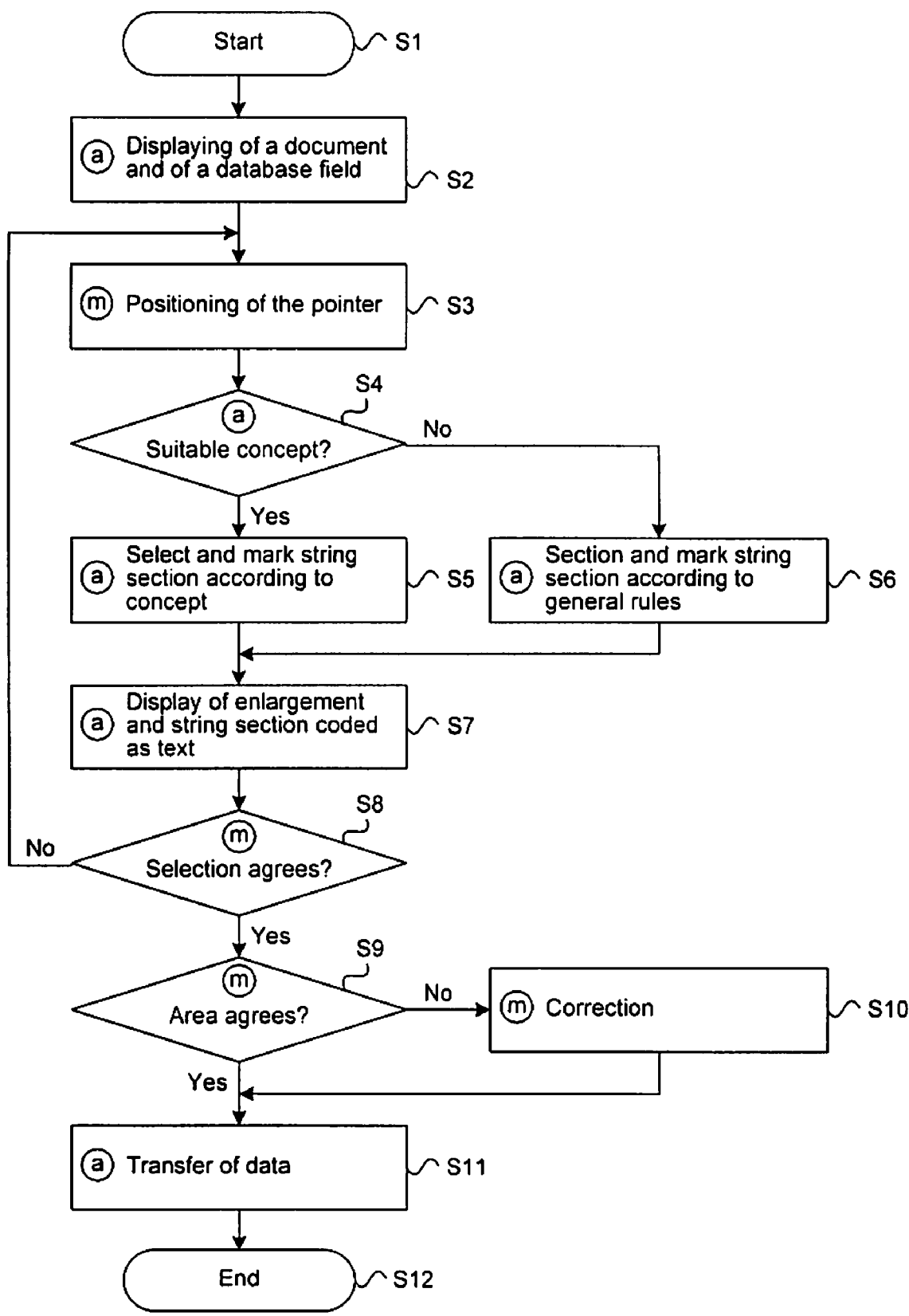
FIG. 1 shows a method for acquiring from a document data that cannot be extracted automatically.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, such alterations and further modifications in the illustrated device, and/or method, and such further applications of the principles of the invention as illustrated therein being contemplated as would normally occur now or in the future to one skilled in the art to which the invention relates.

With the methods explained above, data can be acquired from a plurality of machine-readable documents, the data being assigned to a database in that individual data are extracted from the document as automatically as possible and are entered into corresponding database fields. If data cannot be extracted with the necessary degree of reliability for one or more particular database fields of a document, for example because an error has been determined, caused for example by the fact that no data or false data are present in the document at the point at which the data are to be read, or that during the reading in of this document using an OCR method one or more characters are falsely converted, then according to the preferred embodiment the following steps are executed:

displaying of the document on a display screen, indication on the display screen of the database field for which the data cannot be extracted with the necessary degree of reliability, execution of a proposal routine with which string sections in the vicinity of a pointer on the display screen that can be moved by a user are selected, marked, and proposed for extraction.

The document is displayed on the display screen so that the user can read it. In addition, the database field is indicated for which the data cannot be extracted with the necessary degree of reliability. In this way, the user is informed of the database field for which the data must still be extracted from the document shown on the display screen.

Through the execution or activation of the proposal routine, string sections in the vicinity of a pointer, movable on the display screen by the user, can be selected, marked, and proposed for extraction. In this way, the user need merely move the pointer on the document shown on the display screen into the vicinity of a string section that contains the data for the indicated database field. The data are then automatically selected, marked, and proposed for extraction. The user can then transfer or incorporate the proposed string section into the database field merely by actuating a particular key.

Through the automatic selecting and marking of the string section, the process of incorporating the still-missing data is significantly simplified and accelerated.

According to a preferred specific embodiment of the present invention, during the selection of the string section concept or design information is taken into account that is assigned to the respective database field.

The method according to the preferred embodiment for acquiring data from machine-readable documents is a development of the methods described above with which data can be extracted from documents and stored in a database by machine.

However, in these methods it is not always possible to fill all database fields of the database reliably with data extracted from the documents. If, for example, there is an error during the extraction of the data, the automatic method is interrupted and, with the cooperation of the user, the data from the document are manually entered into database fields. Such an error can result from the fact that in the document to be processed no suitable string section is found from which the data can be read, or the string section contains erroneous data that arise for example during the conversion of the document into coded text using an OCR method.

The method according to the preferred embodiment thus begins when data cannot be reliably extracted. The expression "not reliably extractable" includes both fundamental errors in the reading of data that make a reading of the data impossible, and also read data that are mapped to the database field while taking into account context information, the quality of the mapping being determined during this process. Such mapping methods include for example the string matching method named above. If the mapping quality achieved here is too low, the automatically read-in data are evaluated as insufficiently reliable and are rejected.

In the following, the method according to the preferred embodiment is explained on the basis of the flow diagram shown in FIG. 1. In the flow diagram, all steps that are executed automatically are identified with an "a" in a circle, and all steps that are to be carried out manually by the user are identified with a "m" in a circle.

The method begins with step S1.

When data for at least one database field cannot be extracted with the necessary degree of reliability, the corresponding document 1 is displayed on a display screen 2, and the database field 3 is indicated (step S2). FIG. 2 shows a display screen representation immediately after the determination that data could not be extracted with the necessary degree of reliability; here the document 1 is shown in a window 4/1 on the right side of the display screen representation. Two windows 4/2 and 4/3 are situated on the left side. Window 4/2 contains an overview of the documents that are to be processed, and in window 4/3 the individual database fields are indicated in which data are stored that are to be read from document 1.

In the example shown, none of the database fields could be filled with data, for which reason the individual database fields 3 are provided with the designation "empty". However, it is also possible for data to be missing only in a few database fields, or only in a single database field.

In FIG. 2, the database field "InvoiceNumber" is marked darker in comparison to the other database fields 3, which indicates to the user that data are to be extracted from document 1 for this database field 3. In addition, in the upper area of window 4/1 the term "InvoiceNumber" is indicated in a larger font, additionally indicating to the user the database field for which data are to be extracted.

In window 4/1, the user can now position a pointer 5 that he preferably situates in such a way that it is located as close as possible to the string section for which the user assumes that the content is to be stored in the corresponding database field. In the example shown in FIG. 2, data are to be extracted for the database field "InvoiceNumber," so pointer 5 is positioned in the vicinity of invoice number "4361" (step S3).

Here, pointer 5 can be moved in window 4/1 using a mouse 6 or via inputs on a keyboard 7.

After the positioning of pointer 5, a proposal routine begins that comprises a plurality of method steps. This proposal routine can on the one hand be initiated in that pointer 5 is not moved for a predetermined time interval, whereupon the proposal routine is then automatically executed, or it can be initiated by actuating a particular mouse button or keyboard key.

In step S4, it is first checked whether there is located in the immediate vicinity of the pointer a string section having a concept suitable for database field 3, insofar as concept information has been previously assigned to the corresponding type of the database field. This concept information includes the syntax and/or the semantics of the database field. Information concerning syntax includes for example the number of numerals and/or letters and/or specified formats of the string section that is to be read. Thus, date fields, amount fields, and address fields have as a rule particular formats. Semantic information includes specified terms that can be entered into the corresponding database field. This is useful for example for currency indications, or if the article designation of a particular supplier that can supply a limited number of articles is to be read in. The corresponding article designations are then stored in a lexicon and can then be unambiguously recognized.

Figure 3:
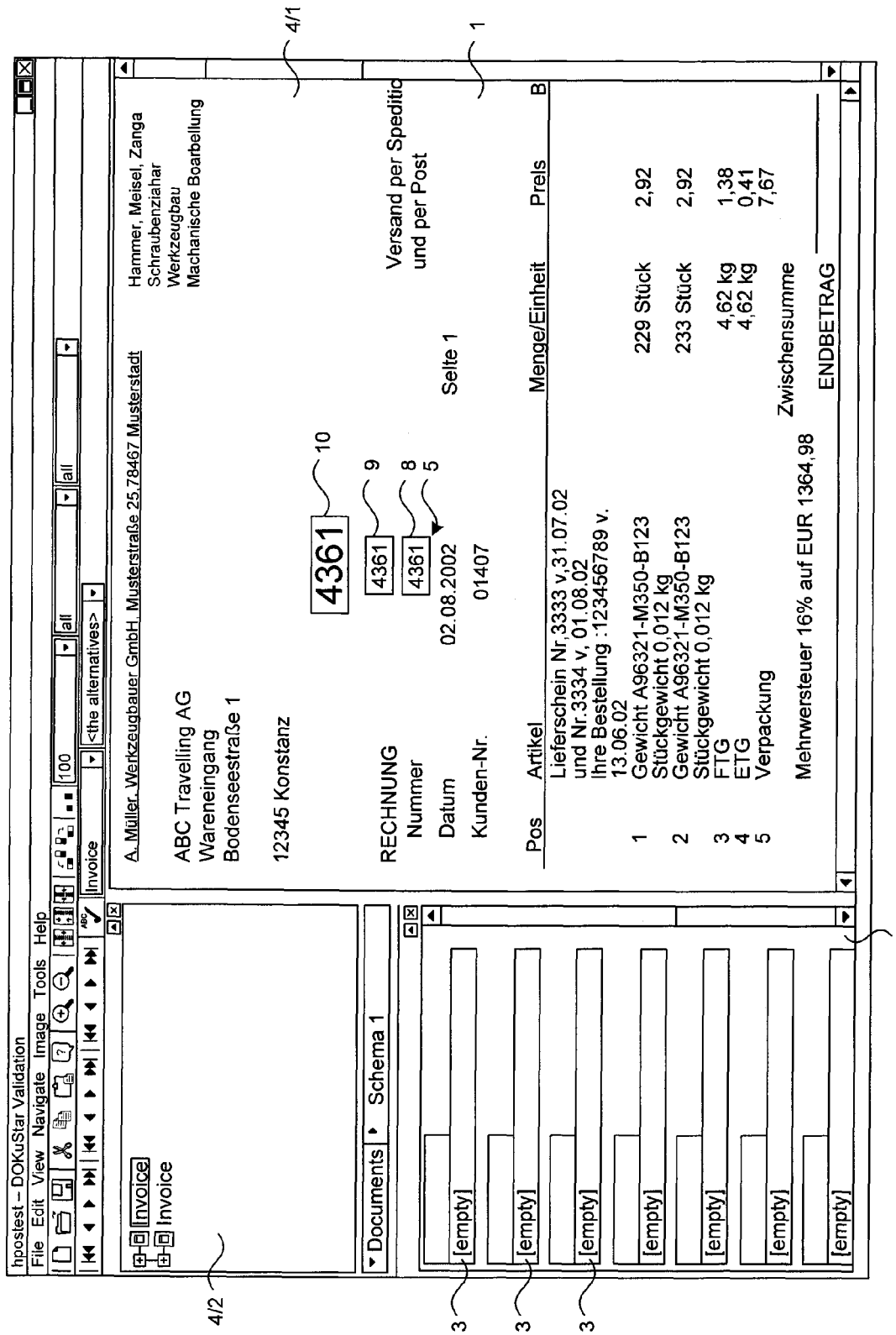

In the exemplary embodiment shown in FIG. 2, the two string sections "4361" and "02.08.2002" are situated in the vicinity of pointer 5. The latter string section has the syntax of a date, and for this reason it is rejected for the extraction of the invoice number. The string section "4361" corresponds to the syntax of an invoice number. Therefore, in step S4 it is decided that a string section having a suitable concept is present, and for this reason the method sequence next goes to step S5. In step S5, the string section "4361" is marked (FIG. 3). In the present exemplary embodiment, the marking takes place through a colored highlighting or background of the string section and through the drawing in of a frame 8.

Figure 4:
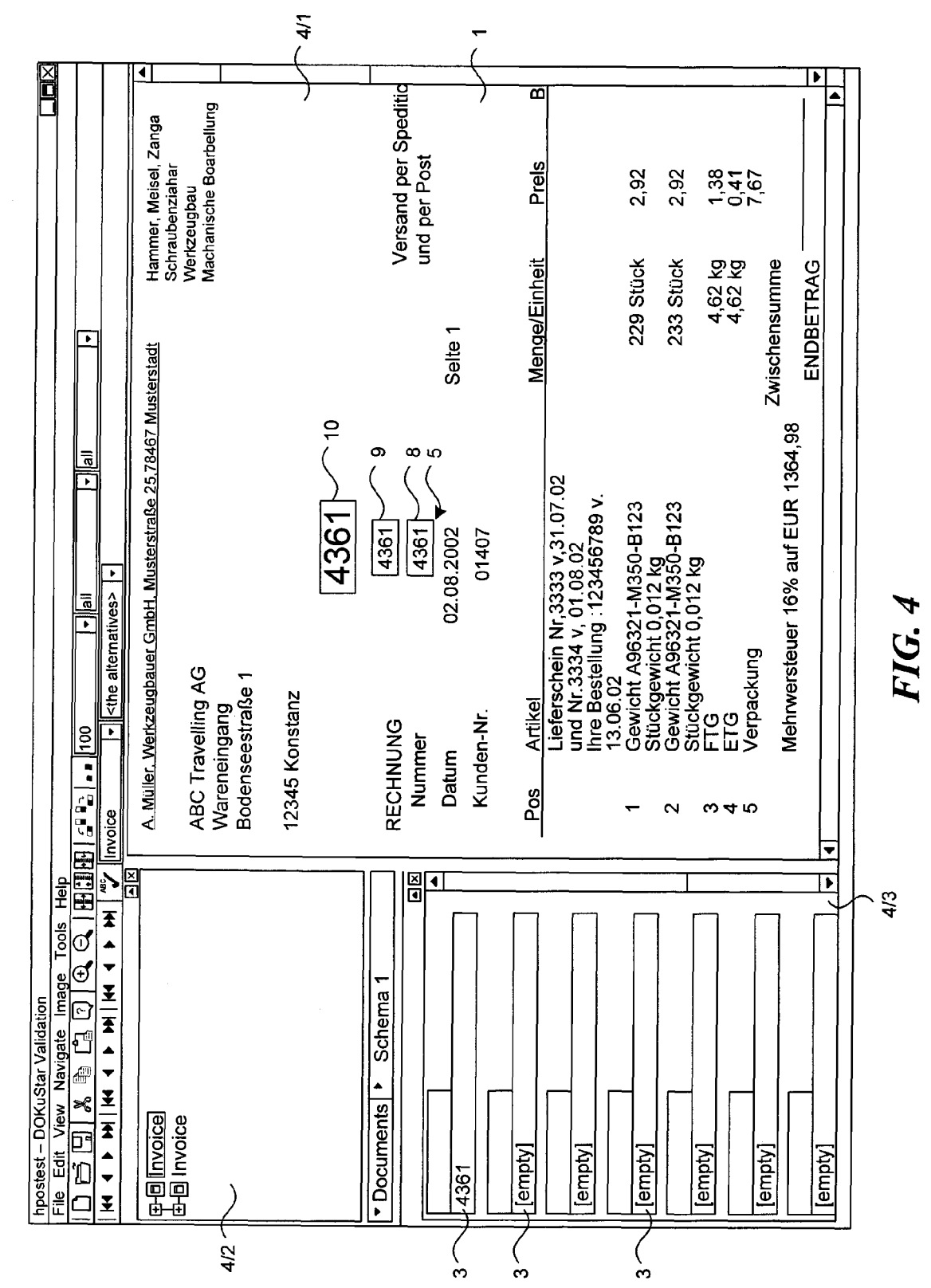

If in step S4 no suitable concept is determined, the method sequence goes to step S6. In step S6, the individual character situated closest to pointer 5 is determined, which, in the present exemplary embodiment according to FIGS. 2-4, is the "1." Subsequently, the boundaries of the string section containing this character are determined according to general rules. These boundaries can for example be determined by empty characters or empty spaces in the document 1, or by particular punctuation marks or other markings in document 1. If corresponding boundary markings are recognized, the string section situated between them is selected and marked. In the exemplary embodiment shown in FIGS. 2 and 3, on each side of string section "4361" there are situated empty spaces, via which an unambiguous selection of the marking of the string section is possible, according to the general rules as well.

Independent of whether the string section has been selected or marked according to step S5 or according to step S6, the method sequence goes to method step S7, with which the string section is displayed in an additional frame 9 as a coded text, and is displayed in an enlarged fashion in another frame 10 (FIGS. 3, 4). In the present exemplary embodiment, document 1 is present as a graphic data file, e.g. in the .pdf, .tif, .gif, or .jpg format. Normally, in the preceding method segment the document was subjected to an OCR routine and converted into coded text. The coded text is here also examined for concepts, and the corresponding information is stored. The section corresponding to the string section is removed from this coded text and is shown in frame 9. In this way, the user recognizes whether the string section has been correctly converted into coded text.

In frame 10, the string section is shown in a graphic format in an enlarged representation, so that the user can also recognize details in the string section.

In step S7, the proposal routine is terminated.

In step S8, the user judges whether the selected and marked string section is fundamentally suitable for transferring into the database field. If this is not the case, pointer 5 is repositioned (S3) and the proposal routine (S4-S7) is executed again. If, in contrast, the selection of the string section is fundamentally suitable, the user judges whether the marked area is also correct (step S9). If this is not the case, the user can manually process the marking of the string section and/or can edit the coded text in frame 9 (step S10). With the editing of the coded text, errors resulting from an incorrect OCR conversion can be removed. When these corrections (adapt area, edit) are made, the marked area and the contents of frames 9 and 10 are automatically adapted.

Figure 5:
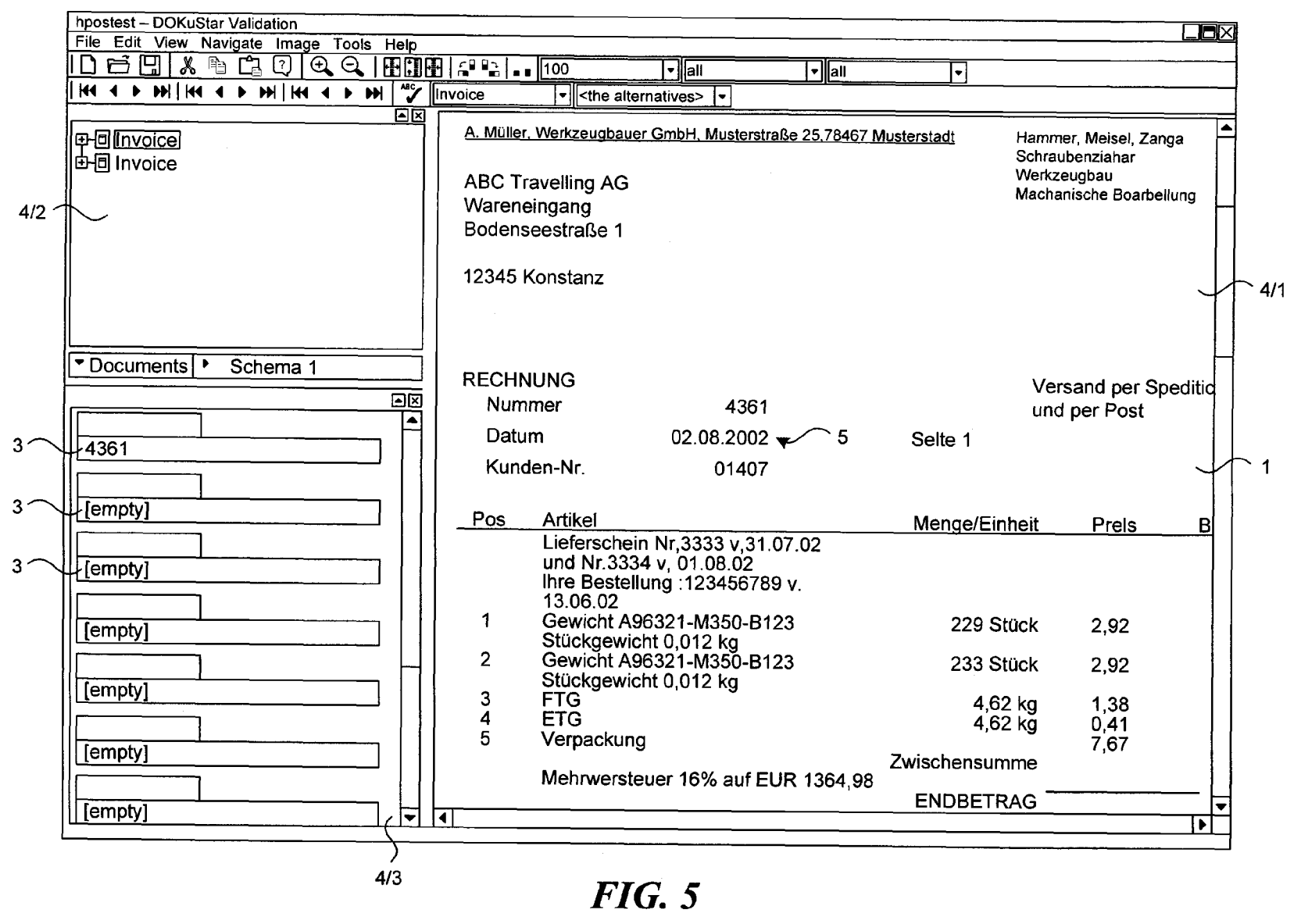

If the marked area is correct or has been correspondingly revised by the user, the method sequence moves to step S11, in which the data contained in the selected string section are transferred into the corresponding database field (FIG. 4). This transferring of the data is initiated by user actuation of a predetermined mouse button or key on the keyboard. Subsequently, the method for extracting data for a database field is terminated (S12). If data are to be read for additional database fields, the method begins again with step S1. In FIG. 5, the next database field to be read ("Invoice Date") is indicated.

With the method according to the preferred embodiment, the activity of a user in the manual transferring of data from a document into a database field is limited to the positioning of the pointer, the checking of the automatically proposed selection and the possible correction of the area, and the actuation of a key in order to transfer the data. The selection and the marking of the area of the string section to be selected are carried out automatically by the method according to the preferred embodiment.

Figure 6:
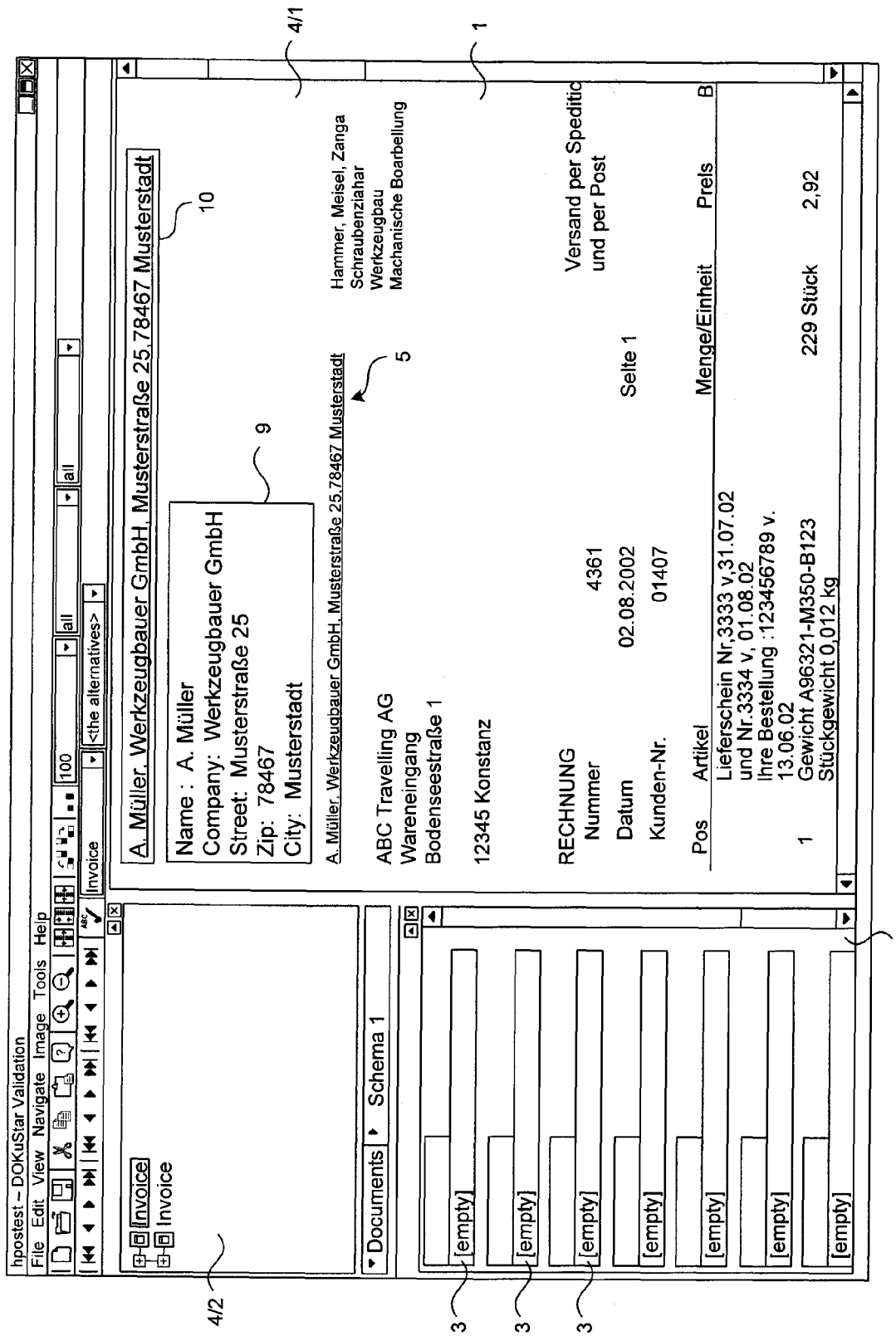

FIGS. 2 to 5 show the transfer of data into an individual database field. However, by taking into account concept information, it is also possible to extract data for a plurality of database fields with a single string section. FIG. 6 shows a corresponding exemplary embodiment, in which the complete address is marked and read as a string section, the address being automatically segmented into the individual database fields name, company, street, postal code, and city.

Figure 7:
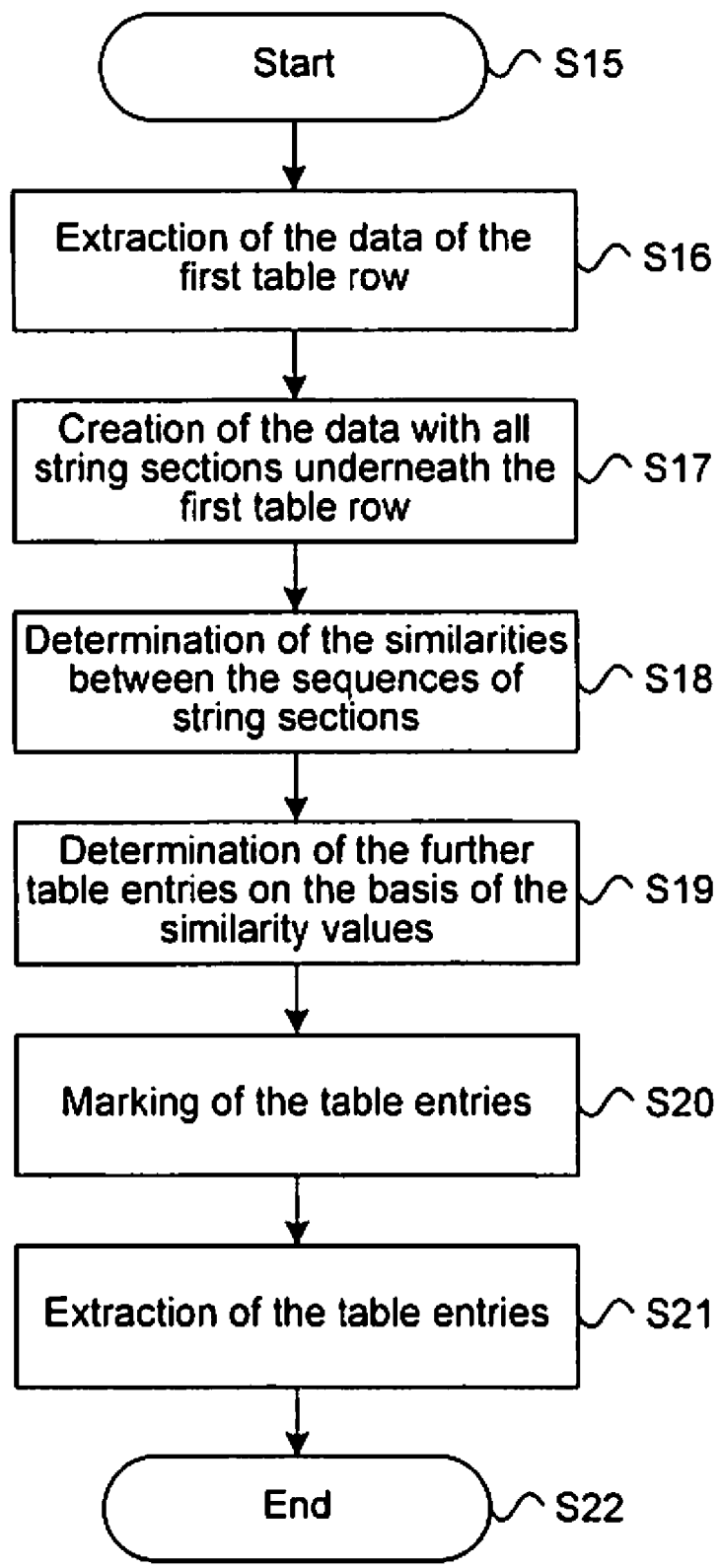
FIG. 7 shows a method for extracting data arranged in tables.

In the following, another construction of the method described above, with which data can be extracted from tables, is explained on the basis of the flow diagram from FIG. 7 and the display screen representations according to FIGS. 8 and 9.

This method begins with step S15.

In step S16, the values of the table in the first table row are extracted according to the above method through the positioning of the pointer, the automatic selection and marking of the string section, and the transferring of the data into corresponding database fields. FIG. 8 shows a table in which the string sections of the first table row are marked that have been transferred into the corresponding database fields. These database fields have the structure of a table; for example, they are applied as a two-dimensional data field, so that during the extraction of the data into these database fields the method recognizes automatically, on the basis of the database field, that data are being read out from a table.

A row of a table can also extend over a plurality of pages if the table correspondingly extends over a plurality of pages. If the data of the first table row has been completely extracted, the user can initiate the automatic extraction of the further table entries using a predetermined input. If this input is actuated by the user, then, in step S17, first a list is created of all string sections that are situated under the first table row.

In step S18, a cost function is used to determine a cost value between sequences of string sections of the list and the sequence of the string sections of the first table row, on the basis of which data were extracted into the database fields in step S16. In this cost function, low costs are assigned to the sequences of the string sections of the list whose string sections agree with, or are at least very similar to, the corresponding string sections of the first table row, with respect to their horizontal position and their width. This cost value is thus indirectly proportional to the degree of similarity between the sequences of string sections appearing in the list and the sequence of string sections contained in the first table row.

The cost function used here corresponds to the cost function described in Chapter 8.6.1 of String Matching Allowing Errors in Modern Information Retrieval (ISBN 0-201-39829-X), with which an individual cost value between a string section of the first table row and a string section of the further table rows is determined. Because each sequence comprises a plurality of string sections, the Viterbi algorithm is used to calculate an overall cost value or overall similarity value for each of the individual sequences of string sections, through summation of the individual cost values.

On the basis of these cost values or similarity values, the sequences of string sections are determined as table rows whose similarity value lies beneath a predetermined threshold value (S19). In this way, all table rows, and thus table entries, of the table are determined. They are marked in step S20 (FIG. 9) and in step S21 they are extracted, i.e., automatically read out, converted into coded text if necessary, and stored in the corresponding database fields.

In step S22, this method is terminated.

Usefully, it is possible to post-process the table entries, i.e., to modify (move, enlarge, make smaller) the marked areas, or to remove or add individual rows. In the case of a post-processing, the entries in the database fields are automatically updated correspondingly.

In addition, during reading out of the data and entering into the database fields an additional check can take place through a mapping using the string matching method, with which it is determined how well the entries agree with the concept specified by the individual database fields.

In addition, the method according to the preferred embodiment can be combined with the method described in German patent application DE 103 42 594.2 for acquiring data from a plurality of machine-readable documents, for which reason reference is made to the complete content of this patent application, and it is incorporated into the present patent application by reference.

In this method for the automatic acquisition of data from a plurality of machine-readable documents, master documents are compared with a read document and their similarity is evaluated. The method applied here can also be used for reading out from a table, the sequence of the selected string sections corresponding to the first table row of the master document, and the combinations of string sections corresponding to the further table rows of the read documents.

In the above-described method according to the preferred embodiment for extracting data from tables, a user need merely move the pointer to the table entries in the first table row and confirm the transferring of the then automatically selected and marked string sections as data for the corresponding database field. After the user has done this for all table entries of the first table row, he need merely initiate the complete reading out of the further table entries by making an input. The method then automatically determines the further table entries, marks them, and extracts the data into the database.

This significantly accelerates the reading out of data from the table into a database. Method segment S17 to S21 therefore represents an independent preferred embodiment in its own right, which is however preferably applied in combination with the method represented in FIG. 1, to which step S16 relates.

Figure 10:
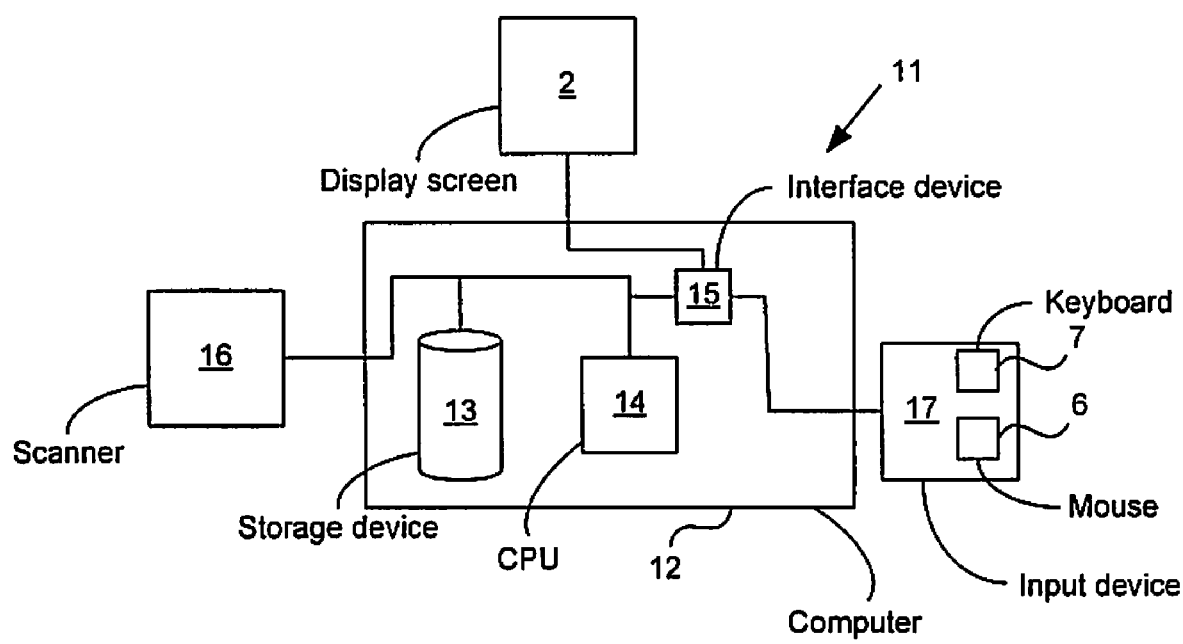
FIG. 10 shows a system for executing the method according to the preferred embodiment.

FIG. 10 schematically shows a system for executing the method according to the preferred embodiment. This system 11 comprises a computer 12 having a storage device 13, having a central processor device (CPU) 14, and having an interface device 15. A scanner 16, a display screen 2, and an input device 17 are connected to computer 12. Input device 17 includes a keyboard 7 and/or a mouse 6.

In storage device 13, a software product is stored for executing the method according to the preferred embodiment, this software product being executed at CPU 14. Scanner 16 is used to acquire documents and to convert them into an electronic data file. These electronic data files are read by computer 12 and are preprocessed if necessary, using an OCR routine and/or a method for recognizing particular syntax or semantics in the data file. Subsequently, the documents contained in the data files are processed in a manner corresponding to the method described above, using system 11. At input device 17, the corresponding inputs can be carried out, these being limited to movements of pointer 5 and a few keyboard inputs. If necessary, the marked fields can be moved using the keyboard or the mouse, or can be adapted by enlargement or by being made smaller, or the coded text can be edited.

The present invention has been explained above on the basis of an exemplary preferred embodiment. Modifications thereof are possible within the scope of the present invention. Thus, for example, instead of frame 8 it is possible to provide only frame 10, in which the selected string section is shown in an enlarged manner. This frame 10 also represents a marking of the string section.

In the above-explained exemplary embodiment, the documents are scanned in and are then present in a graphic format. However, the method according to the preferred embodiment can also be used for reading information from documents that are already present in coded text, such as for example e-mails. Of course, given such an application it is not necessary for the documents to be converted into coded text using an OCR routine.

Consequently, the preferred embodiment can be briefly summarized as follows:

The preferred embodiment relates to a method for acquiring data from machine-readable documents, the data being assigned to a database.

With the preferred embodiment, string sections located in the vicinity of a pointer that can be moved by the user are automatically selected and marked, and their content is proposed for transfer into a database.

According to a development of the method according to the preferred embodiment, the content of a table can be read out in a fully automatic manner if the table entries in a first table row have already been read out according to the above method.

An exemplary preferred embodiment in various forms of the present invention have been described. Here it is clear that someone skilled in the art can at any time indicate modifications and developments that make use of the concept of the preferred embodiment. In addition, the preferred embodiment can be realized both by means of electronic components (hardware) and through computer program elements (software or software modules). In particular, the preferred embodiment is realized here as a combination of electronic hardware elements and software elements. Correspondingly, the preferred embodiment also includes computer program products, such as for example electronic data carriers (CDs, DVDs, diskettes, tape drives), or components that are distributed via computer networks (Internet) and/or on computers, and in particular are loaded into intermediate storage units and are kept ready there and/or are run from there.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

I claim as my invention:

1. A method for acquiring data from a non-transitory machine-readable or computer-readable document for assignment to fields of a database, comprising the steps of:
    extracting individual data substantially automatically from the non-transitory machine-readable or computer-readable document and entering the extracted data into the corresponding database fields;
    determining if any of the individual data cannot be extracted from the non-transitory machine-readable or computer-readable document with a desired degree of reliability for one or more particular database fields; and
    if data cannot be extracted from the document with the desired degree of reliability for one or more particular database fields, executing the steps of
        displaying the non-transitory machine-readable or computer-readable document on a display screen,
        displaying on the display screen the one or more database fields for which the data cannot be extracted with said desired degree of reliability, and
        executing a proposal routine with which string sections in a vicinity of a pointer movable by a user on the display screen are selected, marked, and proposed for extraction.

2. A method according to claim 1 wherein one of the string sections is selected, marked, and proposed for extraction in accordance with concept information assigned to the database field.

3. A method according to claim 2 wherein the concept information describes a syntax or semantics of the database field, so that the proposal routine selects and marks a string section that is to be marked in a manner corresponding to the syntax or to the semantics of the respective database field.

4. A method according to claim 3 wherein the information concerning syntax describes a number of numerals or letters or predetermined formats of the string section that is to be read.

5. A method according to claim 3 wherein the information concerning semantics describes specified terms.

6. A method according to claim 1 wherein a string section is selected that is situated between two limiting characters.

7. A method according to claim 6 wherein the limiting characters include empty characters or punctuation marks.

8. A method according to claim 1 wherein text of the document in graphic representation is first converted into coded text using an OCR method, and the proposal routine represents, in addition to a marked string section in graphic representation, coded text of said string section.

9. A method according to claim 1 wherein in addition to a marked string section, said string section is displayed again on the display screen in an enlarged representation.

10. A method according to claim 1 wherein after marking one of the string sections, the proposal routine activates a function with which a content of a marked string section is transferred into the database through actuation of one or more predetermined keys.

11. A method according to claim 1 wherein during the execution of the proposal routine, after movement of the pointer a predetermined time wait interval is observed, during which the pointer must not be moved, before one of the string sections is selected.

12. A method according to claim 1 wherein a table is displayed as said document on the screen, and after data have been read from a first row of the table into corresponding database fields, further table entries of further table rows are automatically determined through a comparison of string sections situated under the first table row with string sections of the first table row.

13. A computer-implemented method for acquiring data from a non-transitory machine-readable or computer-readable document for assignment to at least one field of a database, comprising the steps of:

extracting individual data from the non-transitory machine-readable or computer-readable document and entering the extracted data into at least one corresponding database field;

determining if any of the individual data cannot be extracted from the non-transitory machine-readable or computer-readable document with a desired degree of reliability for one or more particular database fields; and if data cannot be extracted from the non-transitory machine-readable or computer-readable document with a desired degree of reliability for at least one of the database fields, executing the steps of displaying the non-transitory machine-readable or computer-readable document on a display screen, displaying on the display screen the database field for which the data cannot be extracted with said desired degree of reliability, and executing a proposal routine with which string sections in a vicinity of a pointer movable by a user on the display screen are selected, marked, and proposed for extraction.

* * * * *